United States Patent [19]

Crosby, Jr.

[11] 3,993,269

[45] Nov. 23, 1976

[54] TOROIDAL TAIL STRUCTURE FOR TETHERED AEROFORM BALLOON

[75] Inventor: Edward Lewis Crosby, Jr., Indialantic, Fla.

[73] Assignee: The United States of America as represented by the Secretary of the Air Force, Washington, D.C.

[22] Filed: Dec. 18, 1975

[21] Appl. No.: 642,048

[52] U.S. Cl. .................................. 244/33; 244/31
[51] Int. Cl.² ........................................... B64B 1/50
[58] Field of Search ............... 244/33, 31, 30, 34 A, 244/87, 88, 96, 125; 40/214

[56] References Cited
UNITED STATES PATENTS

| | | | |
|---|---|---|---|
| 3,119,579 | 1/1964 | Borgesson et al. | 244/31 |
| 3,395,877 | 8/1968 | MacFadden et al. | 244/33 |

FOREIGN PATENTS OR APPLICATIONS

| | | | |
|---|---|---|---|
| 562,091 | 10/1931 | Germany | 244/33 |

Primary Examiner—Trygve M. Blix
Assistant Examiner—B. L. Kelmachter
Attorney, Agent, or Firm—Joseph E. Rusz; Richard J. Killoren

[57] ABSTRACT

A tethered aeroform balloon having an inflated toroid tail structure secured to the balloon hull by means of a plurality of rope lines for supporting the drag forces and the weight and steering forces of the tail structure. The inflated tail structure has a substantially symmetrical air foil section with support diaphragms secured inside the tail structure. The tail structure is inflated by an electric motor powered fan supported on the tail structure. A pressure switch prevents over inflation of the tail structure. A check valve prevents the escape of air from the tail structure when the fan is not running.

5 Claims, 8 Drawing Figures

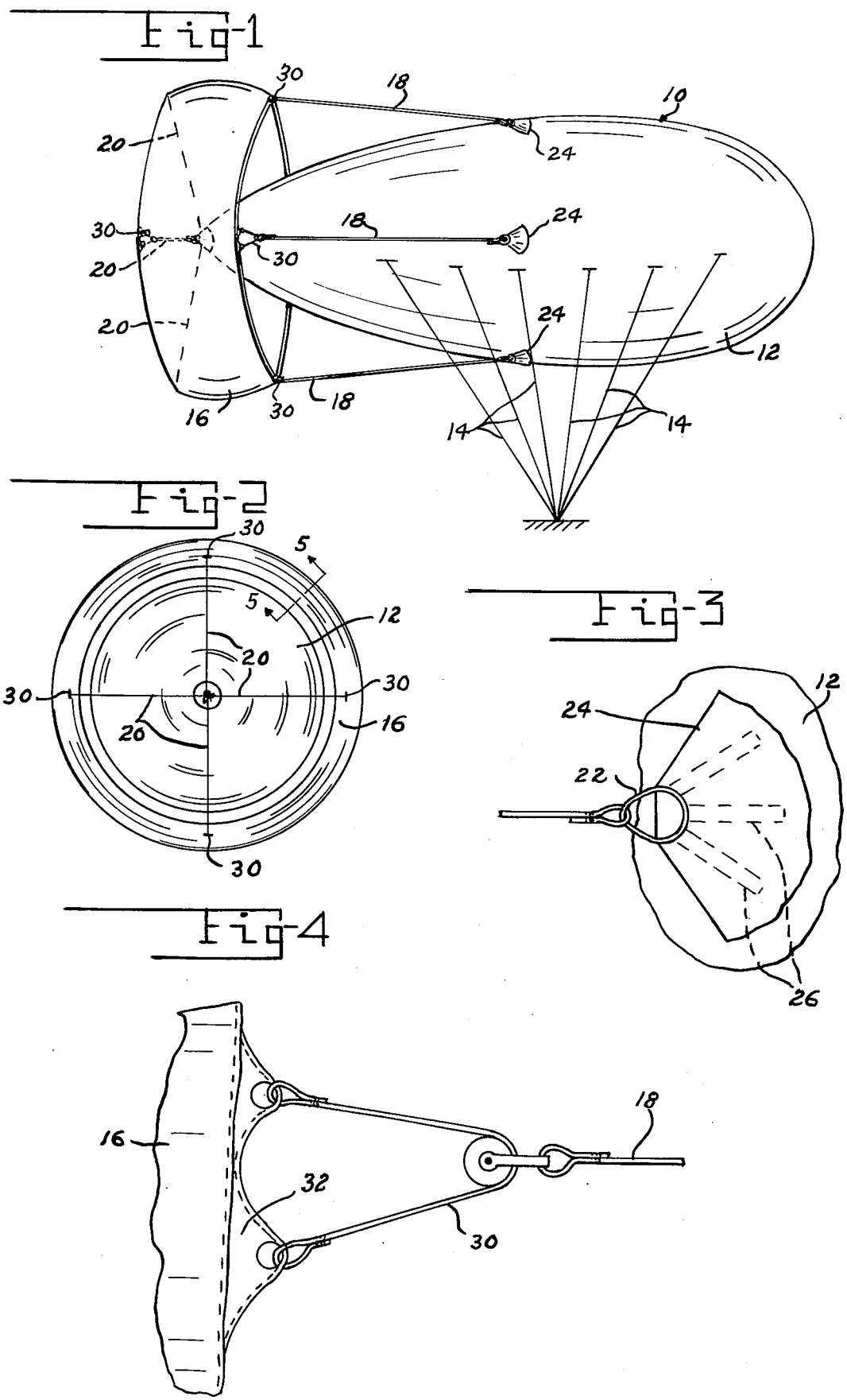

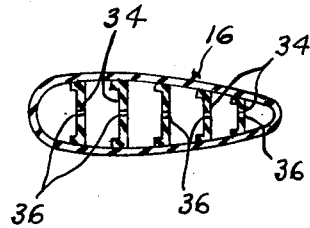
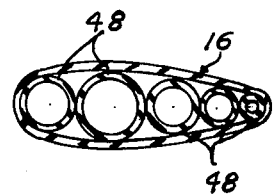
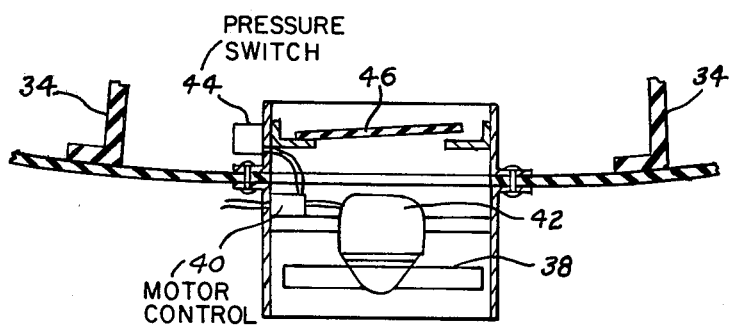
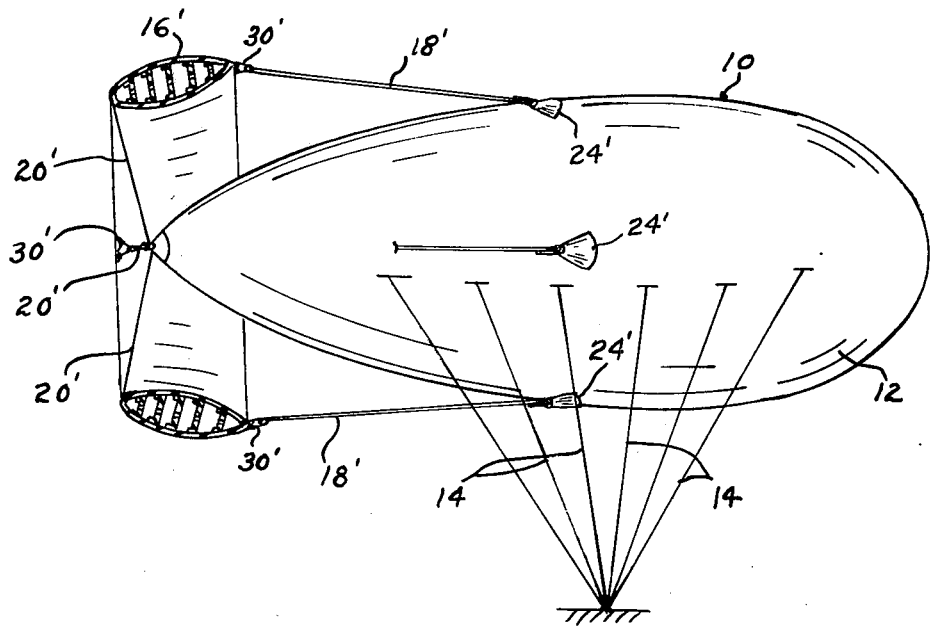

TOROIDAL TAIL STRUCTURE FOR TETHERED AEROFORM BALLOON

BACKGROUND OF THE INVENTION

This invention relates to a tail structure for a tethered aeroform balloon. Various tail structures for aerodynamic vehicles have been used. The U.S. patent to Adams, No. 2,074,765, shows various configurations used with apparatus to provide steering mechanism for an aircraft. Rigid ring type structures have been used in aerial bombs.

All known balloon tails are fin or wing like bodies, which are attached to the hull at their roots. These develop relatively large cantilever forces and since the balloons are made of soft material, the attachment interface is a problem. The systems used for attachment of the wing like bodies to the balloon hull have been very complex structures, which are very costly and add a considerable weight penalty.

BRIEF SUMMARY OF THE INVENTION

According to this invention, an inflated toroidal shaped structure is used for the tail of a balloon. The tail structure is secured to the balloon hull by means of rope lines which transfer aerodynamically induced forces from the tail structure to the hull. The tail structure is inflated with one or more electric-powered fans mounted on the tail structure. The fans are controlled by a pressure switch to prevent over-inflation. A check-valve prevents escape of air from the toroidal tail structure when the fan is not running.

IN THE DRAWINGS

FIG. 1 is a schematic drawing showing a balloon including the tail structure of the invention.

FIG. 2 is a left end view of the device of FIG. 1.

FIG. 3 is an enlarged view showing the hull attachment device for the device of FIG. 1.

FIG. 4 is an enlarged view of the toroidal tail attachment device for the device of FIG. 1.

FIG. 5 is an enlarged sectional view of the device of FIG. 2 taken along the line 5—5.

FIG. 6 shows one type of inflation apparatus for the tail structure of the device of FIG. 1.

FIG. 7 shows a modified tail structure for the device of FIG. 1.

FIG. 8 is a schematic view partially in cross section of a further modification for the tail structure for the device of FIG. 1.

DETAILED DESCRIPTION OF THE INVENTION

Reference is now made to FIG. 1 of the drawing which shows a conventional tethered aeroform balloon structure 10 having a hull 12 normally held by suspension lines 14. A toroidal shaped tail member 16 is secured to the balloon hull 12 by stay ropes 18 and 20.

The stay ropes 18 and 20 are secured to the hull by means of steel bridle rings 22 as shown in FIG. 3. The rings 22 are secured to the hull by means of what is known in the balloon art as a load patch made up of fabric patches 24 and reinforcement web straps 26 which are cemented to the hull.

The lines 18 and 20 are secured to the toroid as shown in FIG. 4 by means of a rolling bridle 30 and catenary patch 32 which is secured to the toroid with cement.

The rope lines 18 take the drag load on the tail structure and the rope line 20 carries the weight of the tail structure and the aerodynamically induced forces which steer the balloon.

The toroidal tail member is shaped as a symmetrical air-foil section, as shown in FIG. 5. The symmetrical airfoil shape does not develop net lift at zero angle of attack. The symmetrical airfoil section will avoid strain in the toroid, which would be caused by outward lift and will avoid the tendency to buckle or crumple, which would be caused by inward lift. Diaphragm elements 34 are cemented into the toroidal structure to maintain the symmetrical shape for the inflated toroid. The diaphragm elements 34 have apertures 36 to permit uniform inflation of the structure.

The structure may be inflated by one or more electric powered fans 38 as shown in FIG. 6. A power supply, not shown, which may be supported by the balloon hull supplies power through motor control 40 to the fan motor 42. A pressure switch 44 prevents over-inflation of the tail structure. A check valve 46 prevents escape of air from the tail structure when the fan is not running. Typical pressures for the inflated tail structure are between 0.036 to 0.180 pounds psi.

Other configurations for the tail structure than that shown in FIG. 5 may be used, for example tubular elements 48 may be used as shown in FIG. 7. Communicating passages, not shown, would be provided in this structure to permit inflation of the structure.

Due to the boundary layer flow into the toroid tail member, it may be desirable to modify the tail structure somewhat from perfect symmetry, such as shown in FIG. 8 wherein the toroid is given a slightly conical configuration. This will align the air foil axis in a direction parallel to the direction of laminar flow which will tend to reduce drag.

There is thus provided a tail structure for a tethered aeroform balloon which will reduce induced roll and which will minimize attachment problems.

I claim:

1. In combination with a tethered aeroform balloon, a tail structure comprising: an inflatable toroidal structure having a symmetrical airfoil cross-sectional shape; a first means connected between said toroidal tail structure and said balloon for supporting the drag loads on said tail structure, a second means connected between said toroidal tail structure and said balloon for supporting the weight of the tail structure and aerodynamically induced forces on said tail structure; means within said toroid for maintaining the symmetrical airfoil shape of the tail structure; means, mounted on said toroidal structure for inflating the tail structure.

2. The device as recited in claim 1 wherein said means for supporting drag loads on the tail structure includes a plurality of stay ropes connected between the sides of the balloon hull and the forward portion of the toroidal tail structure and said means for supporting the weight of the tail structure and the aerodynamically induced forces on the tail structure includes a plurality of stay ropes connected between the tail end of the balloon hull and the rearward portion of the toroidal tail structure.

3. The device as recited in claim 2 wherein said means for maintaining the shape of the toroidal structure includes a plurality of diaphragm elements inside the toroidal structure; said diaphragm elements being cemented to the walls of the toroidal structure.

4. The device as recited in claim 2 wherein said means for maintaining the shape of the toroidal structure includes a plurality of tubular elements positioned within the toroidal structure.

5. The device as recited in claim 2 wherein said toroidal structure has a conical configuration with the smaller diameter of the conical configuration being at the aft end of the toroidal structure.

* * * * *